July 12, 1938.  R. H. RANGER  2,123,258
MUSICAL INSTRUCTION
Filed Nov. 21, 1932    3 Sheets-Sheet 3
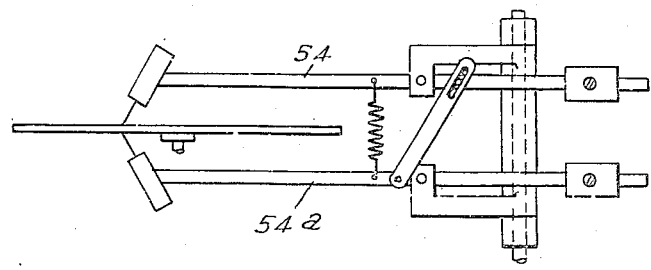
FIG. 7
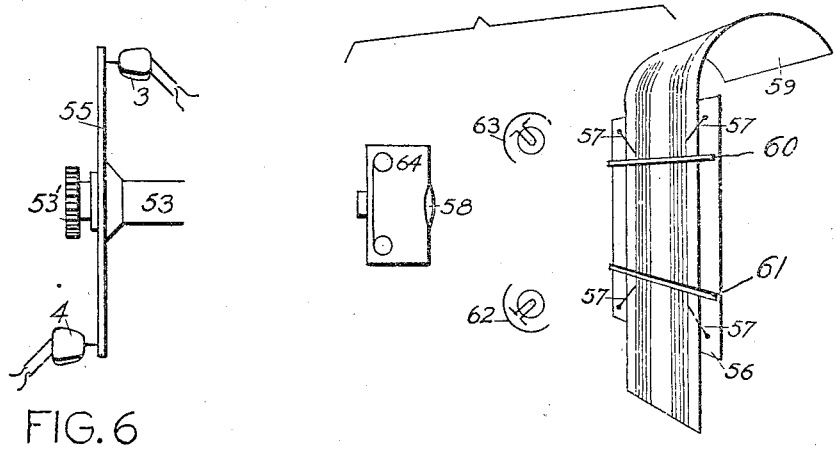
FIG. 6
FIG. 8
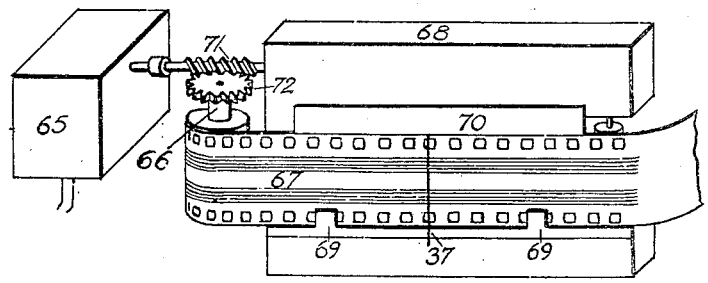
FIG. 9
INVENTOR
Richard Howland Ranger Patented July 12, 1938

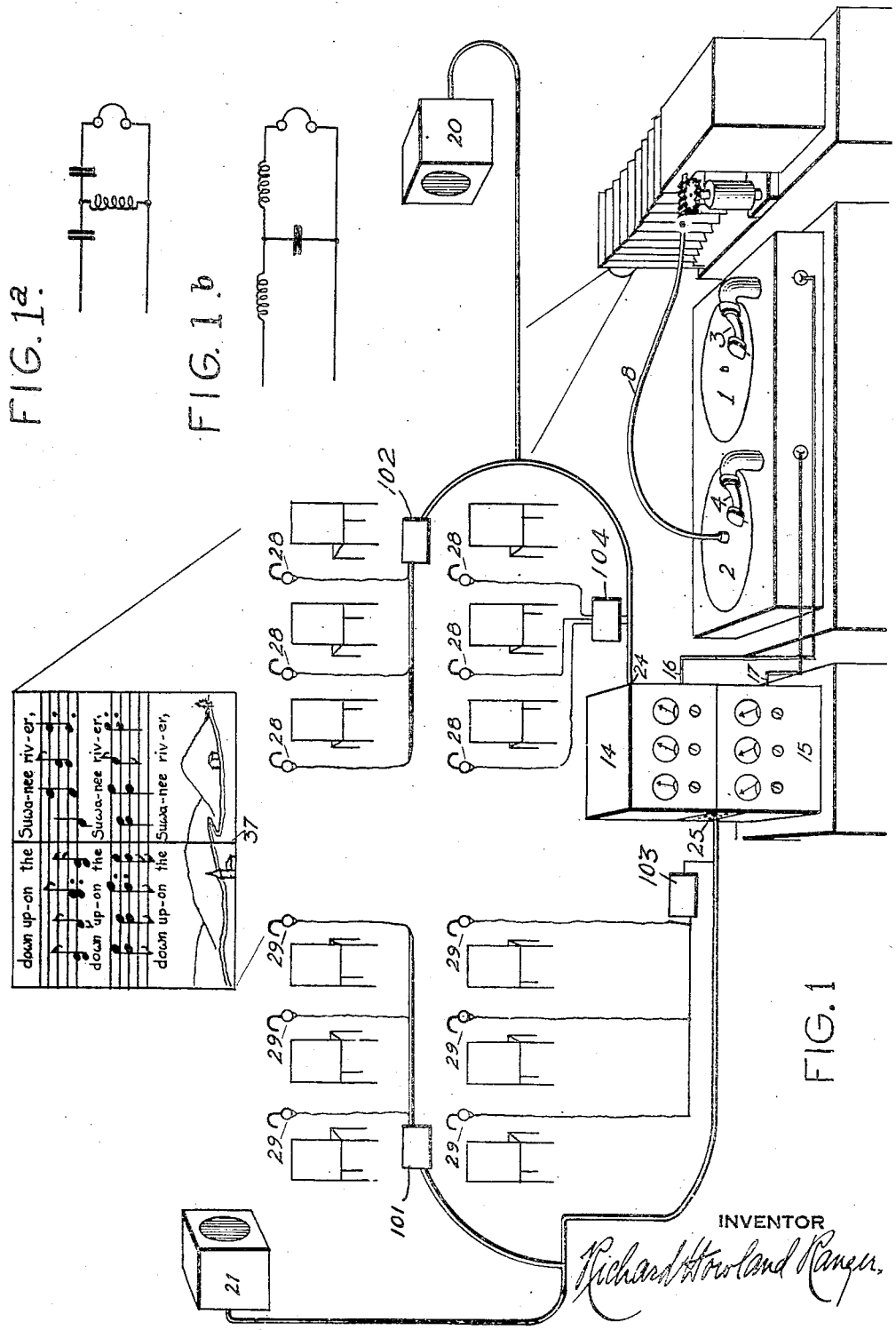

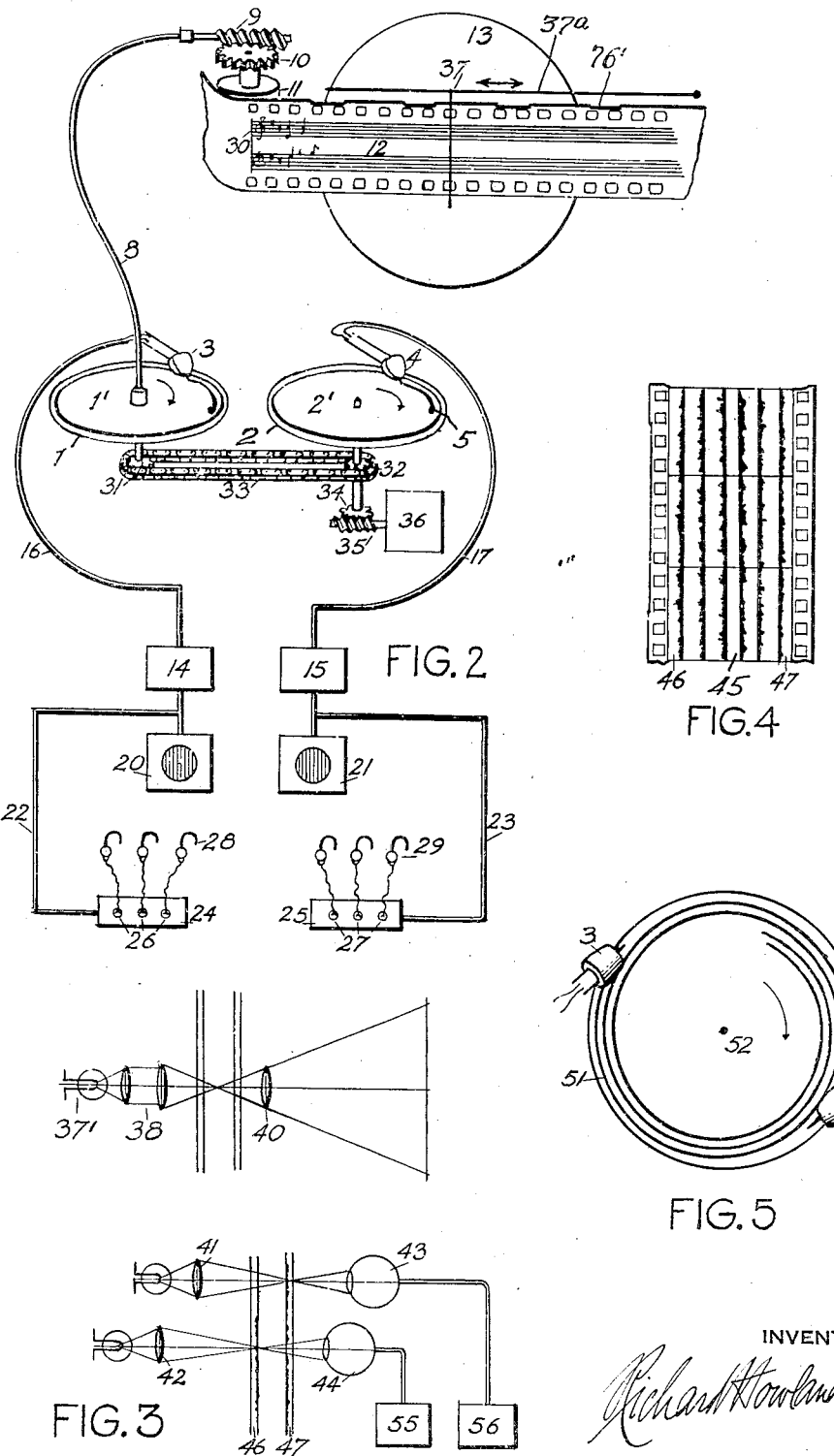

2,123,258

UNITED STATES PATENT OFFICE 2,123,258

MUSICAL INSTRUCTION

Richard Howland Ranger, Newark, N. J.

Application November 21, 1932, Serial No. 643,623

4 Claims. (Cl. 84—470)

The present invention has been evolved in connection with the development of a system for teaching the accurate reading and rendition of written music and for convenience of disclosure of the principles of the invention such an embodiment will be more particularly described. It will be understood, however, that the particular description is illustrative merely and that the various features of the invention can be otherwise applied without departing from the scope of the invention.

Music, whether instrumental or vocal, is written or printed by means of a universal convention of notation, various symbols being used to indicate the pitch, amplitude, and length of duration of all the separate notes which go to make up a complete composition. Thus musical instruction consists in large part in teaching the performers to translate such symbols into sounds which they represent, much as instruction in languages is concerned with the translation of written or printed intelligence into audible words. This is especially the case with elementary musical instruction; as the performers become more adept, of course, less stress need be laid on the reading of music, and more attention may be paid to shades of interpretation.

Experience in teaching the performance of music leads to the conclusion that the most important aid in developing the ability to perform music is the hearing of that music correctly rendered. If, at the same time that it is so heard, it is seen in written form, the instruction is made doubly effective. It must also be appreciated that the written symbols cannot at best, give the complete information as to the interpretation. Therefore, hearing the music properly interpreted represents a distinct advance over merely seeing the score. There are many instrumentalities of the present day which lend themselves in a measure to this purpose, but so far as I am aware, they have not been correlated in an effective system. Furthermore, their cost has been such as to prohibit their general application to home and school use.

It is a primary object of this invention to develop an improved system for teaching music by the example of proper performance combined with an indication of the written counterpart of the selection performed.

Another object is to provide an improved apparatus for assisting accurate musical performance whereby a performer may hear a correct rendition of the part he is performing while his teacher or audience does not hear such rendition.

Another object is to provide an improved method of producing sound records.

Another object is to provide an improved sound record having different tonal parts separately recorded.

Another object is to provide an improved method of rendering music comprising a plurality of tonal parts.

Still another object is to provide a method of teaching music and an apparatus therefor whereby the musical score may be shown to the student progressively and at the same time one or more tonal parts of the score may be rendered audible to him.

A further object is to provide a system for musical instruction adaptable both for individual instruction and for the instruction of larger groups where the several tonal parts to a composition are allocated to different performers.

The invention in its preferred form provides a projection device for projecting on a suitable screen the musical score, a few bars at a time, while advancing the same progressively and a phonographic arrangement for making audible to the performer such tonal part or parts of the score as it is desired that he should hear for the purpose of his guidance in performing the written music.

I have found that the rapidity and accuracy with which the performers respond to such instruction methods is most gratifying. The results of instruction by this method are greater than may be achieved by the usual reiteration methods of teaching, and far from removing the individuality of the teacher, the method gives the teacher the opportunity to concentrate on the actual performance of one member of a group and to give special instruction while the others of the group carry on under the guidance of the equipment.

From the psychological point of view, it may be thought that such an arrangement as is herein described may tend to lessen the true capabilities and discourage the efforts of students in the actual art of music production, but experience proves otherwise. This aid to instruction may be gradually removed with the progress of the student, and this easing into free performance proves conclusively that the first requirement in correct music production is training the ear to hear and appreciate true musical interpretation from printed notes to audible sound.

The above noted system is equally applicable to choral or group instrumental musical instruction wherein an example of proper performance may be given to guide the individual performer, while at the same time he is allowed to hear some or all of the remaining tonal parts of the composition, in order to promote a sense of proper harmony and balance. By tonal parts I mean the harmonic divisions of a composition, as for instance the bass and tenor parts in an anthem.

The nature and objects of the invention will be better understood from a description of a particular illustrative system and illustrative apparatus for use in the practice of that system. For the purpose of such description reference should be had to the drawings forming a part hereof and in which—

Figure 1 is a diagrammatic representation of an arrangement of apparatus for teaching the performance of music in accordance with the principles of the invention, Figs. 1a and 1b are respectively electrical diagrams of the high pass and low pass filters, Fig. 2 is a diagrammatic view showing certain details of the apparatus, Fig. 3 is a diagrammatic view illustrating the arrangement of the visual projection device and a sound reproducing mechanism, Fig. 4 is a view showing a film having several sound records recorded thereon, Fig. 5 is a diagrammatic view illustrating a multiple groove record, Fig. 6 is a view illustrating a two-sided record with separate pick-up devices, Fig. 7 is a detail view of a pick-up device having pick-up elements for engaging opposite sides of the record, Fig. 8 is a diagrammatic view illustrating an arrangement for use in producing a music score film, Fig. 9 is a detail view of a mechanism for showing a music score.

In the present description, emphasis will be given to the use of the audio-picture method for vocal instruction, but the same equipment and methods are equally adaptable to instrumental performance and to other performance than that of music. The apparatus is perfectly adaptable, for example, to the teaching of languages or in fact anything where a correlation between sight and sound is effective.

For the purpose of illustrating how the sound-picture instructor is organized, it may be assumed that the equipment is set up as shown diagrammatically in Figs. 1 and 2. The turntables 1 and 2 indicate regular phonograph turntables, only two of which are shown, upon which phonograph records may be placed. These turntables are run from the same power supply and turn synchronously. For this purpose, a chain 33 is shown, connecting two sprocket wheels 31 and 32 beneath the turntables. A motor 36 drives the worm 35 to turn both turntables. Each of the records to be carried by the turntables may have one or more of the tonal parts of the composition recorded thereon. In order that the two records may be started in perfect synchronism, each record groove is provided in the starting position with a suitable guide mark or depression 5 for the placing of the needles of the pick-ups 3, 4. These depressions, one of which is shown enlarged to the right at 5, are large enough for convenient placing of the needle and they form the start of the usual spiral of the record. The groove is slightly enlarged toward this starting depression and the needle will easily slip out of the depression into the groove. This may start on the outside for the older type record or on the inside as is usual in sound records accompanying motion pictures. It may be assumed by way of example that the record on the right on turntable 2 has the soprano part and the tenor. The record on the left has the alto and bass. There is sufficient differentiation between these parts to make them readily distinguishable by the student, and ordinarily satisfactory results may be obtained if each student hears, in the earphone or in the loudspeaker, two such separated parts. There are certain advantages in this arrangement. However, in some cases it is desirable to permit the student to hear only a single part and in such cases the records would be correspondingly cut. Again, if desired the records may be so cut that the student hears all of the parts but in such case the part which he is to render may advantageously be made louder than the other parts.

In order that the projector for showing the music score may be driven in synchronism with the turntables, a direct connection between the projector and the turntable driving mechanism may be provided. As shown, a flexible cable 8, such as commonly known as dental cable is connected to the driving shaft of one of the turntables and to the shaft of the worm 9. This worm turns the gear 10 which is connected to the film sprocket 11, which turns the film 12, past the projecting lens system at 13. This projection system comprises the normal condensing lens and projecting lens of stereopticon and motion picture practice. The film passes between the condensing lenses, not shown, and the projecting lens, indicated at 13. A concentrated filament light, as is normal practice projects the light through the lens system and the film. The film carries the record of the notes of the music. A starting line is shown at 30. The film should be turned to the position in which the line 30 corresponds with the position of wire 37. This wire passes directly across the field of the light and is projected as a black line on the screen. This wire is adjustable forward and back by means of the rod 37a, to allow for minor adjustments in synchronism between the film and the records during the playing. It serves as a guide for reading the music as the notes approach it.

With the two reproducing heads at their starting positions and the film on the starting line, the apparatus is set in motion and the words and music are projected on the screen while synchronously the records turn under the pick-up units and the sound recorded thereon is transmitted from these units, which are preferably of the usual magnetic type, to the amplifier system as indicated in Fig. 2. The leads 16, 17 from the magnetic pick-up units 3, 4 are connected respectively to amplifiers 14 and 15. These amplifiers are of the usual type and give an available gain of about sixty decibels. An appropriate potentiometer is connected to each of these amplifiers to adjust the volume to the desired level. Two forms of output from the amplifiers are shown, the two loud speakers 20, 21 and the telephone receivers or ear phones 28, 29 such as are worn by telephone operators. Either or both may be used. These receivers are fed through leads 22 and 23 to junction positions 24, 25 in which jacks 26, 27 engage with plugs on the ends of the receiver cords, and each performer, seated in one of the chairs shown in Fig. 1, wears one of the receiver sets. The receiver method is particularly advantageous for individual instruction, because the desired tonal part or parts may be made audible to each student while not audible to the instructor or audience or other students wearing a differently connected ear phone. For some purposes the use of the loud speakers with or without the telephone receivers may be preferred. Usually the speaker 20 will be positioned nearer to the altos and bassos and speaker 21 nearer to the sopranos and tenors.

In the arrangement diagrammed in Fig. 1, high pass filters 101, 102 and low pass filters 103, 104 may be introduced to reduce the loudness of one part in each ear phone. The electrical diagrams of high and low pass filters respectively are shown in Figs. 1a and 1b.

The above description assumes that the film and records are available. Their manufacture involves in itself considerable planning. The method which I have found best for their manufacture starts with the making of the film. The music is first played on a piano and by checking with a stopwatch, the speed is determined. Ordinarily for a music score written in 4/4 time a speed of one frame in four seconds is satisfactory, but obviously, the speed may be adjusted as may be desired for the particular composition. There are certain advantages in arranging the music score longitudinally of the film and projecting said film in horizontal position as indicated in the drawings. When so arranged the music is so laid out on the score sheet that in the film all frames are of the same length to accord with the uniform speed of the film. The music is timed on the usual musical scale for the various parts. This timing is based on the number of quarter notes in a minute; sixty quarter notes to the minute being a frequent value. So the music is marked in these appropriate values; sixty, eighty, forty, or whatever may seem most appropriate in its various positions. An enlarged copy of this music is then written out by hand on large music paper, and the film record made photographically therefrom. It is easily possible so to space the notes that on the film record they will come out to the correct time when passed through a projector at the rate of one frame in four seconds. In practice this enlarged drawing of the music is photographed by means of a step-by-step camera, taking one frame of the film at a time, the music paper and the film being advanced a distance corresponding to one frame between exposures. As to the actual values which I have used, the paper on which the music is drawn is eleven inches wide and comes in strips about 32 inches long. The music scale is ruled on this paper by a regular ruling machine. Four scales are ruled on the sheet, so that four individual parts may be drawn in, one below the other. A twelve to one reduction of the music is made as it is photographed from the paper to the film. A film frame is approximately ¾ of an inch long, so the corresponding enlarged frame on the paper is nine inches long and the paper and the paper strips are long enough to take three frames. A copying stand is arranged as shown in Fig. 8. The paper copy 59 is slipped under the frame guides 60 and 61, and fastened down by clips 57 on board 56. Lights 62 and 63 illuminate the copy and standard. Camera 64 with lens 58 takes single exposures as the copy is advanced frame by frame. Thus the paper is evenly illuminated and the pictures taken one at a time from the paper onto the film. For a tempo of sixty there will be two measures to a frame for 4/4 time. Where the music retards or speeds up, the spacing will be lengthened or shortened accordingly.

Now, with this film photographed and developed as a negative, it is then put directly in the projection machine previously described and thrown on the screen before an electric organ. The electric organ described in my co-pending application and known as the Rangertone, is here specified, as it is a very useful instrument for making the phonographic records, but of course any other suitable instrument could be used, even an ordinary piano, with an appropriate microphone pick-up to carry the sound to the engraving head on the record. But the electric organ is particularly useful, as, with it, the volume of the tones may be accurately controlled, so that the cutting will be most effective. For preliminary work, pre-grooved records, well known in the phonographic art have proved very useful. For such purposes, a pre-grooved record is put on one of the turntables of Fig. 2, say number one. A cutting head having a cutting needle is substituted for the pick-up 3 and the needle set in the starting recess. The film is placed at its starting position and then the equipment is put in motion. A four second delay has proved ample between the starting of the machine and the beginning of the music. The electric organ above mentioned or any suitable instrument of electrically generated tones may be used, the electrical circuits of the instruments being used to control the cutting unit directly, or another musical source, a microphone and the necessary connections may be used. As the operator sees the first note advance to the line 37, which may be called the "baton" line, as it indicates the time of the music, he will start playing. I have found it advantageous to play all of the tonal parts of the music on the first record made, as would normally be done in playing a selection. This gives a smoother balance to the entire playing and keeps the proper tempo. A slight variation between the music score as projected and the sound record is permissible inasmuch as there are eight seconds of film always visible in the projection. This prevents the music from being too stereotyped. So the complete selection is played on one record in general time with the film. This record then becomes the master record for making the part records. This record is likewise useful in itself as the general accompaniment to playing the music for all the parts.

Now, with this record made, the individual part records are made. For this purpose, the master record is put on turntable 2, and the pick-up connected to the amplifier is placed in the starting hole. On table 1 is placed another pre-grooved record upon which one of the tonal parts is to be cut. I have found that it is better to cut one part at a time instead of two. Therefore, we will say that the soprano part is now cut on turntable 1 at the same time that the music is seen on the projected film and heard from turntable 2 connected to the amplifier and one of the head phones. If one part only is desired on this record, it is then finished. But if it is desired to add the tenor, for example, this is now done right over the first recording. I have found this to be quite practicable on pre-grooved records, and it gives far better quality on each recording than does the joint recording of both at the same time. It seems possible to use larger values of tone when the two are recorded separately. Furthermore, it is possible to use two entirely different types of tone for these two separate recordings to differentiate them even more, i. e., a flute tone may be used for the soprano and an oboe quality for the tenor.

In the same manner that the soprano-tenor record is made, an alto-bass record may then be made. Now that both records are made, the recording unit is removed and the pick up 3 reconnected on table 1. The sound-picture instructor is now available with the complete records of tone and music to be used for the effective teaching of the individual or group.

As an alternative to the phonograph method, using two separate records, a single double spiral record may be used as shown in Fig. 5. This consists of a double record 52 where two spirals 50 and 51 are placed side by side on the record. It might be termed a double entry spiral from the same phrase in screw cutting nomenclature. The two spirals are preferably started one hundred and eighty degrees apart on the record so that the two pick-ups may be nicely positioned on the record. The starting recesses are placed on the record in exactly the same manner as described for the single spiral record. Now, the separate parts may be cut in the two separate spirals instead of on the two separate records, as previously described. While a double spiral record has been described, it is obvious that a triple or even quadruple spiral record might be made, but it is believed that the double spiral will serve most purposes. A multiple spiral groove, however, is considered within the scope of this invention.

In place of putting the spirals all on one side of the record, they may be placed on two sides as shown in Figure 6 in which case the pick-ups 3 and 4 may be placed to engage the opposite sides of the record 55, driven through shaft 53 with the record locked on by nut 53'. These double entry and double sided records, as one feature thereof, insure absolute synchronism between the playing of the music of the various parts. Two pick-ups may be placed on each side of a record having double-entry spirals on each record face. It should be noted that in using both sides of a record, that if the arms are working opposite each other, the spirals must be left handed on one side of the record, and right handed on the other side.

The pick-up may be arranged as shown in Fig. 7. The adjustable weight balanced swinging arms 54, 54a carry the pick-up with the needles in opposed relation. A spring draws the arms toward each other to provide the desired pressure on the record and a pin and slot connected link, while permitting necessary play causes both pick-ups to be retracted from the record when one is manually lifted therefrom.

In addition to or instead of the actual music notes, from the musical instrument, the words themselves may be sung with a microphone and recorded on the separate spirals, and the students will quickly follow these words. In practice the advantage of the absolute accuracy of tone made possible by the use of an instrument of electrically generated tones, outweighs for most purposes, the advantage of substituting the human voice. It will be noted too that appropriate stops may be used for various parts such as the flute, oboe, etc. Likewise, instruction such as to make it louder or softer may be thrown in by voice on the phonograph record. By the method described, the records may conveniently be made to embody the interpretation of the composer or any desired artist by having the player record made by him. Annotations may be written on the projection film record either before or after photographing, also little drawings descriptive of the subject matter of the song may be drawn on the record as shown in Fig. 1. This would be particularly effective on instruction records for younger children.

While the description so far has been confined to the use of the phonograph record, it is obvious that the entire invention may be likewise carried out using the modern technique of sound pictures on film. Preferably, but not necessarily, a separate film is used for the sound record. In that case several sound tracks may be used side by side, as shown in Fig. 4, at 46. The separate sound tracks may record respective parts of one composition and so that the separate parts may be led to separate amplifiers, 55 and 56 as shown in Fig. 3, and if desired different compositions may be recorded on one film, as there is ample room on the film width to record the parts of several compositions. The photo cells 43 and 44 get the modulated light through the sound tracks 47 and 46 from the light systems 41 and 42. The sight part is projected by light system 37', 38 and 40 from the music score film. The recording on film will be accomplished through the steps of making first the note pictures, then master sound record, then individual sound records, as specified for the phonograph records. But inasmuch as this is a little more difficult with sound recording, the alternative of using separate players or singers to record the individual sound records at the same time on the same film may be preferred. For this purpose, the organ may be played away from the singers, and they with head phones will hear the music to keep them together in time and pitch while the individual microphones will carry their individual performances to separate sound tracks. The organ music may be placed on a separate sound track. Likewise instruction may be placed on yet another separate sound track.

In following the last mentioned procedure groups of singers singing respectively different tonal parts may sing in different rooms and microphones may be arranged to carry each part to a reproducing loud speaker, suitable controls being introduced into the circuits so that the intensity or loudness of each part may be controlled to provide the balanced ensemble. The director by thus controlling the intensity of the several parts in the loud speaker also controls the intensity of the sound as recorded on the record whether a phonographic record or a sound film record. This method of operation has the advantage and especially in the case of only one or a few singers executing each tonal part that each may sing at such intensity or loudness as is most natural and the ensemble result may be balanced giving the desired intensity to each part. This feature is equally applicable whether the sound is recorded on records or the loud speaker is rendering the music for an audience. This also makes an excellent method of broadcasting.

The separate recording of the different parts furthermore makes possible the reduction of extraneous noises, scratch and the like. This is because in reproduction, a filter may be used passing only the desired range of frequencies. Also a much wider cut may be made on the high frequencies if there are no lows present.

The described method of producing the sound records can be modified in a manner to provide greater accuracy of the sound records whether phonographic or film records. Such process involves producing the film record of the music as hereinbefore indicated and then playing the music on a pianola player recorder while the operator views the projected film. A paper strip record is produced by the player recorder in which the notes as played are recorded by ink marks to indicate the position of the perforations to be punched in the record. The record so marked may then be corrected by hand to eliminate the errors in execution and otherwise to improve the rendition of the music. When finally corrected and punched the record strip becomes a master record. It may then be played and even further corrections made before it is finally accepted for use. Similar records carrying either one part alone or two parts, for example, the alto and base, may then be prepared by selection of the punches of the master record corresponding to the respective parts and then punching the new record accordingly. The part records so produced may then be used as control records for operating an instrument of electrically generated tones and the phonographic record or film sound record may then be produced in accordance with the principles hereinbefore outlined.

As an alternative to the described method of producing the projection record the phonograph record may be first prepared, beginning by playing the music on the player recorder to produce the player record, as above described and then the projection film record can be prepared manually using the corrected player record as a guide and taking all necessary measurements therefrom. The method has the advantage that the time as represented on the projection screen is less stereotyped and better represents the expression of the actual execution.

It is one of the advantageous features of the invention that the music score film and the sound records, both of the phonographic and sound film type, can be economically produced and conveniently stored. A two foot strip of music and two records constitute the entire record for a composition two minutes long. With the new type long-playing records, records up to ten minutes duration may be readily obtained, and the corresponding music score film would be slightly less than ten feet in length.

Instead of projecting the sight record, it is obvious that either the film or preferably a paper copy of the notes may be moved directly in front of the singer or player. For such purpose, the flexible cable of Fig. 8 may be made long enough to reach the player, or, preferably, the two equipments may be driven by synchronous motors on the same power supply. In the latter case, a very compact equipment may be made for the note observation as shown in Fig. 9. Here, 65 is a very small synchronous motor with its reduction gearing as is regularly manufactured for synchronous clocks. Worm 71 drives wheel 72 which in turn drives sprocket spindle 66, carrying record 67. Record 67 is guided on support 68 by lower and upper guides 69 and 70. Several such units may be operated simultaneously, on the same synchronous power supply. Each player will place his record with the "start" line at the "baton" wire position 37, and the leader will start all the synchronous motors simultaneously by turning on the current. He may likewise stop, slow down or speed them all up synchronously by using a small motor-generator to furnish the synchronizing current to all of them with speed control on the motor side. A "thyratron inverter" might also be used to furnish this alternating current.

A paper record, such as used to control the electric organ, inasmuch as it is frictionally driven may slip more or less and may, therefore, get out of step with the projection record to which it corresponds. For this reason it is desirable to provide an automatic timing or regulating device or mechanism to insure the maintenance of the desired speed of the record as compared with the sight record. To this end a series of perforations are formed in the paper record positioned to be correlated with corresponding indications in the projection record which for example, may be notches in the edge of the projection films. Feeler mechanisms are arranged to cooperate with the projection record and with the paper record and suitable associated mechanism is provided whereby if the perforation of the paper record comes opposite the feeler mechanism, either before or after the corresponding mark on the projection record comes opposite its feeler mechanism then the paper record will be correspondingly slowed down or speeded up.

Particular embodiments of the invention have been here described and illustrated, but it will be understood that changes in the construction and set-up may be made, various features may be differently combined and other embodiments developed within the scope of the invention as indicated by the appended claims, in view of the wide field of usefulness of the system.

I claim:—

1. Apparatus for assisting ensemble musical performance comprising, in combination, a plurality of phonographic records, each recording one or more but not all of the tonal parts of a musical composition, an electromagnetic pick-up device for each record and means for driving said records synchronously relative to said pick-up devices and a receiver for each pick-up device.

2. In apparatus for musical performance, a record strip, a plurality of sound tracks on said record strip each recording one or more tonal parts of the musical composition and means for picking up, amplifying and reproducing separately and synchronously the recorded content of each of said sound tracks in synchronism.

3. In apparatus for musical performance a film, a plurality of sound tracks of said film each recording one or more tonal parts of the musical compositon and means for picking up, amplifying and reproducing separately and synchronously the recorded content of each of said sound tracks in synchronism including receivers in which the users may each hear selectively part of the composition but only that part.

4. In apparatus for musical performance a sound record having a plurality of tracks each of which records two tonal parts of a musical composition and means for picking up, amplifying and reproducing separately and synchronously the recorded content of each of said sound tracks including receivers and filtering means in the receiver circuits for separating the two parts recorded in each sound track.

RICHARD HOWLAND RANGER.